United States Patent
Vontorcik, Jr. et al.

(10) Patent No.: US 12,391,790 B2
(45) Date of Patent: Aug. 19, 2025

(54) ARTICLES MADE FROM HYDROPHILIC THERMOPLASTIC POLYURETHANE COMPOSITIONS

(71) Applicant: Lubrizol Advanced Materials, Inc., Cleveland, OH (US)

(72) Inventors: Joseph J. Vontorcik, Jr., Broadview Hts., OH (US); David Cozzens, Dracut, MA (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 18/119,902

(22) Filed: Mar. 10, 2023

(65) Prior Publication Data

US 2023/0212348 A1    Jul. 6, 2023

Related U.S. Application Data

(62) Division of application No. 16/308,834, filed as application No. PCT/US2017/038219 on Jun. 20, 2017.

(60) Provisional application No. 62/355,490, filed on Jun. 28, 2016.

(51) Int. Cl.
```
B29C 45/00     (2006.01)
B29C 64/106    (2017.01)
B33Y 10/00     (2015.01)
B33Y 70/00     (2020.01)
B33Y 80/00     (2015.01)
C08G 18/06     (2006.01)
C08G 18/08     (2006.01)
C08G 18/10     (2006.01)
C08G 18/32     (2006.01)
C08G 18/48     (2006.01)
C08G 18/66     (2006.01)
C08G 18/73     (2006.01)
C08G 18/75     (2006.01)
C09D 11/102    (2014.01)
B29K 75/00     (2006.01)
```

(52) U.S. Cl.
CPC ........ *C08G 18/758* (2013.01); *B29C 45/0001* (2013.01); *B29C 64/106* (2017.08); *B33Y 10/00* (2014.12); *B33Y 70/00* (2014.12); *C08G 18/10* (2013.01); *C08G 18/3206* (2013.01); *C08G 18/4833* (2013.01); *C08G 18/6674* (2013.01); *C08G 18/73* (2013.01); *C09D 11/102* (2013.01); *B29C 2945/76531* (2013.01); *B29K 2075/00* (2013.01); *B33Y 80/00* (2014.12); *C08G 18/06* (2013.01); *C08G 2250/00* (2013.01); *C08G 2261/50* (2013.01)

(58) Field of Classification Search
None
See application file for complete search history.

(56) References Cited

U.S. PATENT DOCUMENTS

| | | | |
|---|---|---|---|
| 6,458,880 B1 * | 10/2002 | Onder | C08G 18/664 524/451 |
| 8,183,330 B2 | 5/2012 | Farkas et al. | |
| 8,296,974 B2 * | 10/2012 | Sonnenschein | C08G 18/4018 528/80 |
| 8,790,763 B2 * | 7/2014 | Farkas | B29C 48/78 528/84 |
| 10,647,808 B2 * | 5/2020 | Vontorcik, Jr. | C08L 75/06 |
| 10,899,870 B2 * | 1/2021 | Cozzens | C08G 18/73 |
| 2008/0207846 A1 * | 8/2008 | Henze | B29C 48/04 525/452 |
| 2010/0109200 A1 * | 5/2010 | Cox | C08G 18/4277 264/334 |
| 2010/0113733 A1 * | 5/2010 | Cox | C08G 18/4018 528/65 |
| 2013/0267639 A1 * | 10/2013 | Zhuang | C08K 5/12 524/285 |
| 2014/0350206 A1 * | 11/2014 | Dorr | C08G 18/4833 528/76 |
| 2015/0004197 A1 * | 1/2015 | Doerr | C08G 18/7692 428/394 |
| 2015/0182811 A1 * | 7/2015 | Bender | B29D 99/0042 264/250 |
| 2016/0024293 A1 * | 1/2016 | Nestle et al. | |

(Continued)

FOREIGN PATENT DOCUMENTS

| | | |
|---|---|---|
| EP | 1236757 A1 | 9/2002 |
| JP | H10-110025 * | 4/1998 |

(Continued)

OTHER PUBLICATIONS

Korley, et al., Effect of the Degree of Soft and Hard Segment Ordering on the Morphology and Mechanical Behavior of Semicrystalline Segmented Polyurethanes, Elsevier, Feb. 27, 2006, Polymer 47 (2006) 3073-3082 (Year: 2006).*

Rasmi et al., "Development of bio-based thermoplastic polyurethane formulations using corn-derived chain extender for reactive rotational molding", 2013, eXPress Polymer Letter, vol. 7. No. 10, pp. 852-862 (Year: 2013).*

(Continued)

*Primary Examiner* — Melissa A Rioja

(74) *Attorney, Agent, or Firm* — Michael A. Miller

(57) ABSTRACT

An article is prepared by injection molding, wherein the article is formed from a hydrophilic thermoplastic polyurethane composition, wherein the thermoplastic polyurethane composition comprises the reaction product of a hydroxyl terminated polyol intermediate component, an aliphatic isocyanate component, and, optionally, a chain extender component. For injection molding, the hydrophilic thermoplastic polyurethane has a crystallization temperature measured by dynamic scanning calorimetry of at least 75° C.

6 Claims, No Drawings

(56) References Cited

U.S. PATENT DOCUMENTS

2016/0333152 A1* 11/2016 Cook .................... B29C 64/112
2018/0282471 A1* 10/2018 Green ................ C08G 18/4833

FOREIGN PATENT DOCUMENTS

| | | | | |
|---|---|---|---|---|
| JP | 2003073445 A | * | 3/2003 | |
| JP | 2006-063129 A | * | 3/2006 | |
| JP | 2009-242655 | * | 10/2009 | |
| JP | 2011-184667 | * | 9/2011 | |
| WO | 2008003932 A1 | | 1/2008 | |
| WO | 2008121579 | | 10/2008 | |
| WO | WO-2008121519 A1 | * | 10/2008 | ............. A61K 8/678 |
| WO | WO-2009055361 A1 | * | 4/2009 | |
| WO | WO-2015088734 A1 | * | 6/2015 | |
| WO | WO2016104456 | * | 6/2015 | |
| WO | WO-2015148248 A1 | * | 10/2015 | ......... B29C 45/0001 |
| WO | WO-2015200103 A1 | * | 12/2015 | ........... A43B 13/023 |
| WO | WO-2016054320 A1 | * | 4/2016 | ......... C08G 18/3206 |
| WO | WO2017079101 | * | 5/2017 | |
| WO | 2018005156 A1 | | 1/2018 | |
| WO | WO2018005156 | * | 1/2018 | |

* cited by examiner

ARTICLES MADE FROM HYDROPHILIC THERMOPLASTIC POLYURETHANE COMPOSITIONS

CROSS REFERENCE TO RELATED APPLICATION

This application is a divisional of co-pending U.S. patent application Ser. No. 16/308,834 filed on Dec. 11, 2018, which claims priority from PCT Application Serial No. PCT/US2017/038219 filed on Jun. 20, 2017, which claims the benefit of U.S. Provisional Application No. 62/355,490 filed on Jun. 28, 2016, the entirety of all of which is hereby incorporated by reference.

TECHNICAL FIELD

The present invention relates to articles made using a hydrophilic thermoplastic polyurethane composition. The articles may be made by injection molding or by 3D printing.

Background

While hydrophilic thermoplastic polyurethanes (TPU) made from aliphatic isocyanates exhibit beneficial properties useful for a variety of articles, the manufacturing methods for making articles from such TPU materials are somewhat limited. In particular, hydrophilic TPU compositions based on aliphatic isocyanates are not used in certain applications because such materials require long processing times that are not commercially acceptable. For example, in injection molding applications or in 3D printing applications such as fused deposition modeling, TPU materials need to set up sufficiently before they can be handled. Hydrophilic TPU based on aliphatic isocyanates have longer cycle times because they typically crystalize at low temperatures or not at all and therefore set up more slowly, resulting in longer time periods before an article can be ejected from a mold or handled after printing. Making articles using injection molding or 3D printing with these materials is not commercially feasible due to long processing times. Therefore, there exists a need to have a hydrophilic TPU based on aliphatic isocyanate that is able to set up in a mold quickly in order to allow articles to be made by injection molding or 3D printing.

SUMMARY

The present invention relates to injection molded or 3D printed articles made from hydrophilic thermoplastic polyurethanes (TPU) and process for making such articles.

In one embodiment of the invention, an injection molded article comprises a TPU composition, wherein the TPU composition comprises the reaction product of a hydroxyl terminated polyol intermediate component, an isocyanate component, wherein the isocyanate component comprises an aliphatic diisocyanate, and optionally, a chain extender, wherein the TPU composition has a crystallization temperature of at least 75° C. as measured by Dynamic Scanning calorimetry (DSC). In one embodiment, the TPU composition comprises 10 wt % to about 50 wt % hard segment. In one embodiment, the TPU composition has a water absorption range of at least 100% as measured by test method ASTM D570. In some embodiments, the chain extender is present and comprises 1,4-butane diol. In some embodiments, the hydroxyl terminated polyol intermediate comprises poly (ethylene glycol).

In another embodiment, an injection molded article comprises a TPU composition, wherein the TPU composition comprises the reaction product of a hydroxyl terminated polyol intermediate component, wherein the hydroxyl terminated polyol intermediate component comprises poly (ethylene glycol), an isocyanate component, wherein the isocyanate component comprises hexamethylene diisocyanate, and a chain extender component, wherein the isocyanate component and the chain extender component make up a hard segment of the TPU composition, wherein the TPU composition comprises 10 wt % to about 30 wt % hard segment, wherein the TPU composition has a water absorption range of at least 100% as measured by test method ASTM D570, and wherein the TPU composition has a crystallization temperature of at least 75° C. measured by DSC. In one such embodiment, the hydroxyl terminated polyol intermediate consists essentially of poly (ethylene glycol). The isocyanate component may consist of or consist essentially of hexamethylene diisocyanate.

Another embodiment of the invention includes a method of making an injection molded article comprising preparing a TPU composition as described herein, wherein the thermoplastic polyurethane composition has a crystallization temperature of at least 75° C. measured by DSC; heating said thermoplastic polyurethane composition to a temperature of 160° C. to 190° C. to melt said thermoplastic polyurethane composition; injecting said melted thermoplastic polyurethane composition into a mold; and cooling said thermoplastic polyurethane composition to form an article.

Another embodiment of the invention includes the use of a TPU composition comprising the reaction product of a hydroxyl terminated intermediate component, wherein the hydroxyl functional intermediate component comprises poly (ethylene glycol), an isocyanate component, wherein the isocyanate component comprises hexamethylene diisocyanate, and optionally, a chain extender component in injection molding to form an article. In one such embodiment, the chain extender is present and comprises 1,4-butanediol.

In one embodiment of the invention, a 3D printed article comprises a TPU composition, wherein the TPU composition comprises the reaction product of a hydroxyl terminated polyol intermediate component, an isocyanate component, wherein the isocyanate component comprises an aliphatic diisocyanate, and optionally, a chain extender, wherein the TPU composition has a crystallization temperature of at least 75° C. as measured by Dynamic Scanning calorimetry (DSC). In one embodiment, the TPU composition comprises 10 wt % to about 50 wt % hard segment. In one embodiment, the TPU composition has a water absorption range of at least 100% as measured by test method ASTM D570. In some embodiments, where the chain extender is present and includes 1,4-butane diol. In some embodiments, the hydroxyl terminated polyol intermediate comprises poly (ethylene glycol).

In another embodiment, a 3D printed article comprises a TPU composition, wherein the TPU composition comprises the reaction product of a hydroxyl terminated polyol intermediate component, wherein the hydroxyl terminated polyol intermediate component comprises poly(ethylene glycol), an isocyanate component, wherein the isocyanate component comprises hexamethylene diisocyanate, and a chain extender component, wherein the isocyanate component and the chain extender component make up a hard segment of the TPU composition, wherein the TPU composition comprises 10 wt % to about 30 wt % hard segment, wherein the TPU composition has a water absorption range of at least 100% as measured by test method ASTM D570, and wherein the TPU composition has a crystallization temperature of at least 75° C. measured by DSC. In one such embodiment, the hydroxyl terminated polyol intermediate consists essentially of poly (ethylene glycol). The isocyanate component may consist of or consist essentially of hexamethylene diisocyanate.

Another embodiment of the invention includes a method of making a 3D printed article comprising operating a system for solid freeform fabrication of an object, wherein the system comprises a solid freeform fabrication apparatus that deposits small beads of building materials in a controlled manner to form a three dimensional article, wherein the building materials comprise a TPU composition, wherein the TPU composition comprises the reaction product of a hydroxyl terminated polyol intermediate component, an isocyanate component, wherein the isocyanate component comprises an aliphatic diisocyanate, and optionally, a chain extender, wherein the TPU composition has a crystallization temperature of at least 75° C. as measured by Dynamic Scanning calorimetry (DSC).

Another embodiment of the invention includes the use of a TPU composition comprising the reaction product of a hydroxyl terminated intermediate component, wherein the hydroxyl functional intermediate component comprises poly (ethylene glycol), an isocyanate component, wherein the isocyanate component comprises hexamethylene diisocyanate, and optionally, a chain extender component in a solid freeform fabrication apparatus fused deposition modeling to form an article. In one such embodiment, the chain extender is present and comprises 1,4-butanediol.

DETAILED DESCRIPTION

Injection molded or 3D printed articles in accordance with the present invention are made using a TPU composition which comprises the reaction product of a hydroxyl terminated intermediate component, an isocyanate component, wherein the isocyanate component comprises an aliphatic diisocyanate, and optionally, a chain extender component. In one aspect of the invention, the thermoplastic polyurethane composition has a crystallization temperature measured by DSC of at least 75° C. in order to allow the thermoplastic polyurethane composition to be injection molded or used in solid freeform fabrication systems (3D printed), efficiently. The TPU compositions of the present invention may also have a water absorption range of at least 100% as measured by ASTM D570. The TPU compositions may also have a hard segment (defined by the amount of the isocyanate alone, or the combination of the isocyanate and chain extender) of 10 wt % to 50 wt %, for example, 13 wt % to 30 wt %.

Hydroxyl terminated Intermediate Component

The TPU compositions described herein are made using a hydroxyl terminated polyol intermediate. Polyols include polyether polyols, polyester polyols, polycarbonate polyols, polysiloxane polyols, and combinations thereof.

In one useful embodiment, the hydroxyl terminated polyol intermediate comprises a polyether polyol intermediate. Hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly (ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. Polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as Poly-THF® B, a block copolymer, and PolyTHF® R, a random copolymer. The various polyether intermediates generally have a number average molecular weight (Mn) as determined by assay of the terminal functional groups which is an average molecular weight greater than about 700, such as from about 700 to about 10,000, or from about 1,000 to about 8,000, or from about 1,400 to about 8,000.

In some embodiments, the hydroxyl terminated polyol intermediate used to make the TPU compositions of the present invention comprises poly (ethylene glycol) having an Mn of about 1,000 to about 10,000. In some embodiments, the hydroxyl terminated polyol intermediate consists essentially of poly (ethylene glycol) having an Mn of about 1,000 to about 10,000. In some embodiments, the hydroxyl terminated polyol intermediate consists of poly (ethylene glycol) having an Mn of about 1,000 to about 10,000.

The Isocyanate Component

The TPU compositions described herein are made using a) a polyisocyanate component. In particular, the polyisocyanate component useful in the present invention is an aliphatic diisocyanate. Examples of aliphatic polyisocyanates include isophorone diisocyanate (IPDI), 1,4-cyclohexyl diisocyanate (CHDI), decane-1,10-diisocyanate, lysine diisocyanate (LDI), 1,4-butane diisocyanate (BDI), 1,5-pentanedii socyanate (PDI), hydrogenated xylene diisocyanate (HXDI), isophorone diisocyanate, hexamethylene diisocyanate (HDI) and dicyclohexylmethane-4,4'-diisocyanate (H12MDI). Mixtures of two or more polyisocyanates may be used.

In any embodiments of the present invention, the polyisocyanate component may consist of or consist essentially of hexamethylene diisocyanate.

The Chain Extender Component

The TPU compositions described herein are optionally made using a chain extender component. Chain extenders include diols, diamines, and combination thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl]

propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), and the like, as well as mixtures thereof. In some embodiments the chain extender includes BDO, HDO, 3-methyl-1,5-pentanediol, or a combination thereof. In some embodiments, the chain extender includes BDO. Other glycols, such as aromatic glycols could be used, but in some embodiments the TPUs described herein are essentially free of or even completely free of such materials.

The chain extender, when present, combines with the isocyanate component in order to form what is known as the "hard segment" of the thermoplastic polyurethane composition. If no chain extender is present, the "hard segment" is formed by the isocyanate component alone. In some embodiments, the TPU composition of the invention comprises at least 10 wt % hard segment. In another embodiment, the TPU composition of the invention comprises 10 wt % to 50 wt % hard segment. In another embodiment, the TPU composition of the invention comprises 10 wt % to 50 wt % hard segment and has a crystallization temperature of at least 75° C. measured by DSC. In one embodiment, the TPU composition comprises 10 wt % to 30 wt % hard segment and has a water absorption range of at least 100% as measured by ASTM D570. In another embodiment, the TPU composition comprises 10 wt % to 30 wt % hard segment, has a water absorption range of at least 100% as measured by ASTM D570, and has a crystallization temperature of at least 75° C. measured by DSC. In another embodiment, the TPU composition comprises at least 13 wt % hard segment has a water absorption range of at least 100% as measured by ASTM D570, and has a crystallization temperature of at least 75° C. measured by DSC.

In order to prepare a thermoplastic polyurethane composition, the three reactants (the polyol intermediate, the diisocyanate, and the chain extender) may be reacted together to form the TPU useful in this invention. Any known processes to react the three reactants may be used to make the TPU. In one embodiment, the process is a so-called "one-shot" process where all three reactants are added to an extruder reactor and reacted. The equivalent weight amount of the diisocyanate to the total equivalent weight amount of the hydroxyl containing components, that is, the polyol intermediate and the chain extender glycol, can be from about 0.95 to about 1.10, or from about 0.96 to about 1.02, and even from about 0.97 to about 1.005. Reaction temperatures utilizing a urethane catalyst can be from about 175 to about 245° C., and in another embodiment from 180 to 220° C.

The TPU can also be prepared utilizing a pre-polymer process. In the pre-polymer route, the polyol intermediates are reacted with generally an equivalent excess of one or more diisocyanates to form a pre-polymer solution having free or unreacted diisocyanate therein. The reaction is generally carried out at temperatures of from about 80 to about 220° C., or from about 150 to about 200° C. in the presence of a suitable urethane catalyst. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about 0.95 to about 1.10, or from about 0.96 to about 1.02 and even from about 0.97 to about 1.05. The chain extension reaction temperature is generally from about 180 to about 250° C. or from about 200 to about 240° C.

Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

In one embodiment, the ingredients are mixed on a single or twin screw extruder with multiple heat zones and multiple feed ports between its feed end and its die end. The ingredients may be added at one or more of the feed ports and the resulting TPU composition that exits the die end of the extruder may be pelletized.

The preparation of the various polyurethanes in accordance with conventional procedures and methods and since as noted above, generally any type of polyurethane can be utilized, the various amounts of specific components thereof, the various reactant ratios, processing temperatures, catalysts in the amount thereof, polymerizing equipment such as the various types of extruders, and the like, are all generally conventional, and well as known to the art and to the literature.

The described process for preparing the TPU of the invention includes both the "pre-polymer" process and the "one shot" process, in either a batch or continuous manner. That is, in some embodiments the TPU may be made by reacting the components together in a "one shot" polymerization process wherein all of the components, including reactants are added together simultaneously or substantially simultaneously to a heated extruder and reacted to form the TPU. While in other embodiments the TPU may be made by first reacting the polyisocyanate component with some portion of the polyol component forming a pre-polymer, and then completing the reaction by reacting the pre-polymer with the remaining reactants, resulting in the TPU.

After exiting the extruder, the composition is normally pelletized and stored in moisture proof packaging and is ultimately sold in pellet form. It being understood that the composition would not always need to be pelletized, but rather could be extruded directly from the reaction extruder through a die into a final product profile.

One or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy) ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

Additives

Various types of optional components can be present during the polymerization reaction, and/or incorporated into the TPU elastomer described above to improve processing and other properties. These additives include but are not limited to antioxidants, such as phenolic types, organic phosphites, phosphines and phosphonites, hindered amines, organic amines, organo sulfur compounds, lactones and hydroxylamine compounds, biocides, fungicides, antimicrobial agents, compatibilizers, electro-dissipative or anti-static additives, fillers and reinforcing agents, such as titanium dixide, alumina, clay and carbon black, flame retardants, such as phosphates, halogenated materials, and metal salts of alkyl benzenesulfonates, impact modifiers, such as methacrylate-butadiene-styrene ("MBS") and methylmethacrylate butylacrylate ("MBA"), mold release agents such as waxes, fats and oils, pigments and colorants, plasticizers, polymers, rheology modifiers such as monoamines, polyamide waxes, silicones, and polysiloxanes, slip additives, such as paraffinic waxes, hydrocarbon polyolefins and/or fluorinated polyolefins, and UV stabilizers, which may be of the hindered amine light stabilizers (HALS) and/or UV light absorber (UVA) types. Other additives may be used to enhance the performance of the TPU compostion or blended product. All of the additives described above may be used in an effective amount customary for these substances.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

In one embodiment, a mold release agent may be added to the TPU described herein and/or to the mold in order to reduce adhesion between the mold and the TPU. As mold release agents, it is possible to use customary substances as are described, for example, in "Kunststoffhandbuch, volume 7, Polyurethane", Carl Hanser Verlag, 3rd edition 1993, chapter 3.4.9. Particular preference is given to using waxes, fats and/or oils as mold release agents.

All of the additives described above may be used in an effective amount customary for these substances. These additional additives can be incorporated into the components of, or into the reaction mixture for, the preparation of the TPU composition, or after making the TPU composition. In another process, all the materials can be mixed with the TPU composition and then melted or they can be incorporated directly into the melt of the TPU composition.

The TPU compositions described herein may be prepared by a process that includes the step of reacting: the isocyanate component described herein, the hydroxyl terminated polyol component described herein and, optionally, the chain extender component described herein, where the reaction is carried out in the presence of a catalyst, and where said catalyst comprises one or more compounds selected tin or iron compounds, resulting in a thermoplastic polyurethane composition.

The process may further include the step of: mixing the TPU composition with one or more blend components, including one or more additional TPU materials and/or polymers, including any of those described above.

The process may further include the step of: mixing the TPU composition of step with one or more of the additional additives described above.

The process may further include the step of: mixing the TPU composition of step (I) with one or more blend components, including one or more additional TPU materials and/or polymers, including any of those described above, and/or the step of: mixing the TPU composition of step (I) with one or more of the additional additives described above.

The compositions of the invention or any blends thereof may also be used to prepare the molded products of this invention in any molding process. The molding processes are well known to those of ordinary skill in the art and include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

TPU compositions of the present invention are unexpectedly useful in injection molding processes. In injection molding processes, molded articles may be fabricated by injecting molten polymer into a mold that shapes and solidifies the molten polymer into desirable geometry and thickness of molded articles. One example of an injection molding process is described as follows: The shaped laminate is placed into the injection molding tool. The mold is closed. The TPU composition of the invention is melted and injected into the mold. The TPU composition may be heated to a temperature of about 160° C. to about 190° C. to melt the TPU composition. The melted TPU composition may be injected into the mold at an injection speed of between 2 and 10 seconds. After injection, the material is packed or held at a predetermined time and pressure to make the part dimensionally and aesthetically correct. Typical total molding cycle time is from about 20 to about 70 seconds and pressures from 1,380 to 10,400 kPa. The mold is cooled between 10° C. and 70° C. to cool the substrate. The temperature will depend on the desired gloss and appearance desired. Typical cooling time is from 10 to 40 seconds, for example, 10 to 30 seconds depending on part on the thickness. Finally, the mold is opened and the shaped composite article ejected.

TPU compositions of the present invention are also unexpectedly useful in 3D printing systems (solid freeform fabrication), in particular fused deposition modeling systems. The TPU compositions described herein are well suited for efficiently making articles using fused deposition modeling systems. Various types of solid freeform fabrication systems and apparatus are known in the art. The TPU composition of the present invention could be used with various types of solid freeform fabrication systems and apparatus. For example, in one embodiment, fused deposition modeling systems include systems that build parts layer-by-layer by heating the building material to a semi-liquid state and extruding it according to computer-controlled paths. The material may be dispensed as a semi-continuous flow and/or filament of material from the dispenser or it may alternatively be dispensed as individual droplets or beads. Fused deposition modeling may sometimes use two different materials to build an object. A modeling material, such as the TPU composition described herein, is used for the article. The modeling material may be deposited on a support material, which can act as "scaffolding" for the modeling material. In one embodiment, material filaments are fed from the systems material stores to a print head, which moves in a two dimensional plane, depositing material to complete each layer before the base moves along a third axis to a new level and/or plane and the next layer begins. Once the system is finished building, the user may remove the support material or even dissolve it, leaving the finished article. In one embodiment, the fused deposition modeling apparatus deposits small beads of the TPU composition described herein in a controlled manner to form the 3D printed article.

The TPU compositions of the invention and any blends thereof may also be formed into monolayer or multilayer films, including breathable films. These films may be formed by any of the conventional techniques known in the art including extrusion, co-extrusion, extrusion coating, lamination, blowing and casting or any combination thereof. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. Typically, the films are oriented in the Machine Direction (MD) at a ratio of up to 15, preferably between 5 and 7, and in the Transverse Direction (TD) at a ratio of up to 15 preferably 7 to 9. However in another embodiment, the film is oriented to the same extent in both the MD and TD directions.

TPU compositions described herein may be used in a wide variety of injection molded articles where the properties of the aliphatic TPU composition and/or hydrophilic TPU are desirable. Some examples of useful applications include, but are not limited to, sports and recreation equipment, footwear, for example shoe insoles and outsoles, medical devices, such as implantable devices including pacemaker leads, artificial hearts, heart valves, stent coverings, artificial tendons, arteries, veins, films containing pharmaceutically active agents, blood bags, ostomy bags, IV bags, and the like. Injection molded articles using TPU compositions of the present invention may also comprise medical tubing and films. TPU compositions described herein can enable articles to be waterproof, breathable, or both.

The TPU compositions of the present invention may also be used for in filaments or fibers such as by electrospinning, force spinning, or even extrusion spinning.

Examples

Thermoplastic polyurethane compositions were made using the polyols and isocyanates listed with 1,4-butanediol chain extender. The isocyanate component and chain extender component make up the hard segment.

TABLE 1

| Ex. | Hard segment wt % | Polyol | Isocyanate | Resin form | Water Absorption (%)* | Tc DSC (° C.) | Cycle Time (Seconds) |
|---|---|---|---|---|---|---|---|
| A1 | 9 | PEG 8000 | HDI | granules | 540 | 36 | not tested |
| A2 | 9 | PEG 8000 | H12MDI | granules | 1037 | 34 | not tested |
| B1 | 13 | PEG 8000 | HDI | granules | 375 | 86 | 50 |
| B2 | 13 | PEG 8000 | H12MDI | granules | 513 | 33 | 67 |
| C1 | 18.5 | PEG 8000 | HDI | granules | 240 | 94 | 33 |
| C2 | 17 | PEG 8000 | H12MDI | granules | 350 | 30 | 37 |
| D1 | 30 | PEG 1450 | HDI | pellets | 119 | 77 | 29 |
| D2 | 30 | PEG 1450 | H12MDI | granules | 148 | −10 | 67 |
| E1 | 40 | PEG 1450 | HDI | pellets | 72 | 102 | not tested |
| E2 | 40 | PEG 1450 | H12MDI | pellets | 89 | N/A | not tested |
| F1 | 50.5 | PEG 1450 | HDI | pellets | 46 | 121 | not tested |
| F2 | 50.5 | PEG 1450 | H12MDI | pellets | 60 | 39 | not tested |

*Water absorption was measured according to ASTM D570 with the following modifications: the specimen dimensions were 2.5" × 0.060" rather than 2" × 0.125" and the soak time was 72 hours rather than 24 hours.

Table 1 illustrates that the combination of HDI and polyethylene glycol at at least 10 wt % hard segment results TPU compositions that have the requisite crystallization temperature for efficient injection molding processes. Examples B1, C1, D1, E1, and F1 are inventive examples, while A1, A2, B2, C2, D2, E2, and F2 are comparative examples. Lower crystallization temperatures mean that it takes a longer time for the TPU composition to set up and be ejected from the mold. The inventive compositions provide suitable materials for making injection molded articles from TPU compositions which use aliphatic isocyanate and are hydrophilic. Moreover, as can be seen by comparison of Examples B1 and B2, C1 and C2, and D1 and D2, the inventive samples made with HDI (B1, C1, and D1) have faster molding times than similar TPU made with H12MDI.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration. As used herein, measurements referred to as made by "DSC" refer to Dynamic Scanning calorimetry using a Perkin Elmer DSC 7.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A method of making a 3D printed article comprising:
preparing a thermoplastic polyurethane consisting of the reaction product of one poly(ethylene glycol) having a number average molecular weight of 1400 to 8000, an aliphatic diisocyanate, and a chain extender component selected from the group consisting of ethylene glycol, diethylene glycol, propylene glycol, dipropylene glycol, 1,4-butanediol, 1,6-hexanediol, 1,3-butanediol, 1,5-pentanediol, neopentylglycol, 1,4-cyclohexanedimethanol, 2,2-bis[4-(2-hydroxyethoxy) phenyl]propane, hexamethylenediol, heptanediol, 3-methyl-1,5-pentanediol, ethylenediamine, butanediamine, hexamethylenediamine, hydroxyethyl resorcinol and mixtures thereof, wherein the thermoplastic polyurethane has a crystallization temperature of at least 75° C. measured by DSC, wherein the aliphatic diisocyanate and chain extender component make up a hard segment of the thermoplastic polyurethane and wherein the thermoplastic polyurethane comprises at least 10 wt % hard segment;
operating a system for solid freeform fabrication of an object, wherein said system comprises a solid freeform fabrication apparatus that deposits small beads of building material in a controlled manner,
wherein the building material comprises the thermoplastic polyurethane.

2. The method of claim 1, wherein the thermoplastic polyurethane comprises about 10 wt % to about 30 wt % hard segment.

3. The method of claim 1, wherein the thermoplastic polyurethane has a water absorption range of at least 70% as measured by ASTM D570.

4. The method of claim 1, wherein the thermoplastic polyurethane has a water absorption range of at least 100 wt % as measured by ASTM D570.

5. The method of claim 4, wherein the aliphatic diisocyanate consists essentially of hexamethylene diisocyanate.

6. A 3D printed article made from the method of claim 1.

* * * * *